United States Patent
Todd et al.

(10) Patent No.: US 10,303,690 B1
(45) Date of Patent: May 28, 2019

(54) AUTOMATED IDENTIFICATION AND CLASSIFICATION OF CRITICAL DATA ELEMENTS

(71) Applicant: EMC IP Holding Company LLC, Hopkinton, MA (US)

(72) Inventors: Stephen Todd, Shrewsbury, MA (US); Anand Singh, Westborough, MA (US); Barbara Latulippe, Bradford, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 165 days.

(21) Appl. No.: 15/359,916

(22) Filed: Nov. 23, 2016

(51) Int. Cl.
*G06F 16/30* (2019.01)
*G06F 16/2457* (2019.01)
*G06F 16/22* (2019.01)

(52) U.S. Cl.
CPC .......... *G06F 16/2457* (2019.01); *G06F 16/22* (2019.01)

(58) Field of Classification Search
CPC .............................. G06F 16/2457; G06F 16/22
See application file for complete search history.

(56) References Cited

U.S. PATENT DOCUMENTS

| | | | |
|---|---|---|---|
| 8,561,185 B1 * | 10/2013 | Muthusrinivasan | G06F 21/6245 705/51 |
| 2009/0043831 A1 * | 2/2009 | Antonopoulos | G06F 3/0614 |
| 2009/0222883 A1 * | 9/2009 | Huo | G06F 21/10 726/1 |
| 2009/0313246 A1 * | 12/2009 | Saito | G06F 17/30864 |
| 2011/0125730 A1 * | 5/2011 | Bordawekar | G06F 17/30445 707/718 |
| 2011/0191341 A1 * | 8/2011 | Meyer | G06F 21/562 707/736 |
| 2012/0278261 A1 * | 11/2012 | Lin | G06N 5/003 706/12 |
| 2013/0262418 A1 * | 10/2013 | Bhasin | G06F 17/30082 707/694 |
| 2014/0201111 A1 * | 7/2014 | Kasravi | G06F 17/30705 706/12 |
| 2016/0306981 A1 * | 10/2016 | Hoog | G06F 21/577 |

OTHER PUBLICATIONS

U.S. Appl. No. 15/072,557 filed in the name of Stephen Todd et al. filed Mar. 17, 2016 and entitled "Metadata-Based Data Valuation."
U.S. Appl. No. 15/268,046 filed in the name of Stephen Gatchell et al. filed Sep. 16, 2016 and entitled "Hierarchical Value-Based Governance Architecture for Enterprise Data Assets."

\* cited by examiner

*Primary Examiner* — Mahesh H Dwivedi
(74) *Attorney, Agent, or Firm* — Ryan, Mason & Lewis, LLP

(57) ABSTRACT

A data governance method comprises the following steps. Data elements from data assets associated with an enterprise are obtained. One or more of the data elements are identified as one or more critical data elements based on a level of criticality computed for each of the one or more data elements. In illustrative embodiments, the level of criticality is based on one or more of: a cardinality computed for the one or more data elements; a business relevance criterion computed for the one or more data elements; and an indirect cross-data lake correlation criterion computed for the one or more data elements.

16 Claims, 8 Drawing Sheets

| | SOURCE 1 | SOURCE 2 | SOURCE 3 | SOURCE 4 | SOURCE 5 | SOURCE 6 |
|---|---|---|---|---|---|---|
| END USER NODES | 1 | 1 | 2 | 0 | 1 | 1 |
| ALL NODES | 7 | 4 | 11 | 2 | 5 | 1 |

FIG. 6
600

| DATA ELEMENT | CRITICAL? | VALUE | RATIONALE |
|---|---|---|---|
| SOURCE 3 | YES | 13 | END USER + ALL NODES > 10 |

700

800

AUTOMATED IDENTIFICATION AND CLASSIFICATION OF CRITICAL DATA ELEMENTS

FIELD

The field relates generally to information processing systems, and more particularly to techniques for implementing data governance in information processing systems.

BACKGROUND

Many different types of information processing systems are configured to incorporate data analytics functionality. However, issues can arise in some of these systems relating to governance of data from multiple distinct data sources within a given enterprise. Such issues can result in analytics performance limitations that can make it unduly difficult to obtain valuable insights from enterprise data assets. Failure to obtain such valuable insight for these data assets can lead to negative results for an enterprise.

SUMMARY

Embodiments of the invention provide improved data governance techniques in information processing systems.

For example, in one embodiment, a method comprises the following steps. Data elements from data assets associated with an enterprise are obtained. One or more of the data elements are identified as one or more critical data elements based on a level of criticality computed for each of the one or more data elements.

In illustrative embodiments, the level of criticality is based on one or more of: a cardinality computed for the one or more data elements; a business relevance criterion computed for the one or more data elements; and an indirect cross-data lake correlation criterion computed for the one or more data elements.

In a further embodiment, the method generates a standardized rationale for identifying each of the one or more data elements as one or more critical data elements, and stores the rationale in an accessible data structure referenced by the one or more critical data elements.

Advantageously, illustrative embodiments provide techniques for automatically identifying, prioritizing and classifying data assets that represent a potential risk to the enterprise (e.g., due to the fact that the data quality is low) and/or a potential lost opportunity to the enterprise (e.g., due to the fact that the importance of the data to the enterprise goes undetected).

These and other illustrative embodiments include, without limitation, methods, apparatus, systems, and computer program products comprising processor-readable storage media.

BRIEF DESCRIPTION OF THE DRAWINGS

FIG. 5 illustrates a data asset cardinality table, according to an embodiment of the invention.

FIG. 6 illustrates a critical data element rationale table, according to an embodiment of the invention.

DETAILED DESCRIPTION

Figure 1:
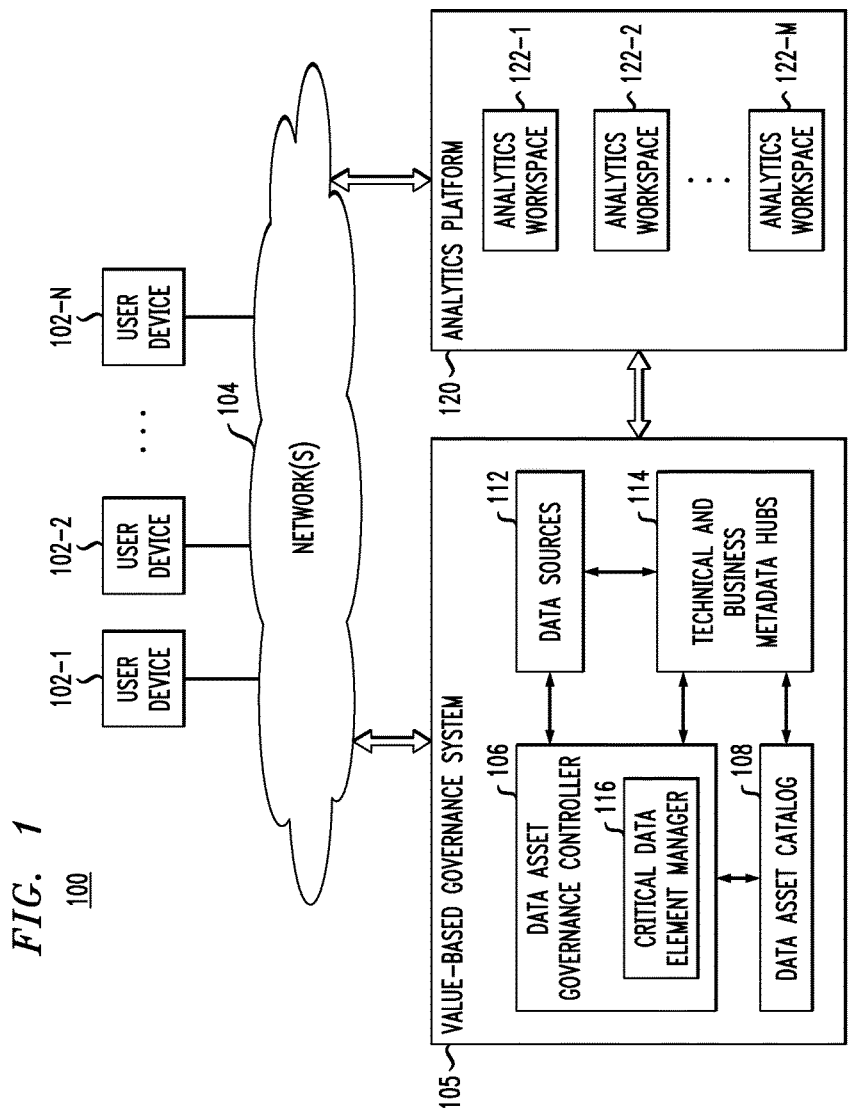
FIG. 1 illustrates an information processing system implementing a value-based governance architecture for enterprise data assets, according to an embodiment of the invention.

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, a plurality of data centers each comprising one or more clouds hosting multiple tenants that share cloud resources.

Many enterprises create and maintain information processing systems in the form of a business data lake (BDL) which serves as a centralized data location for storing, sharing, collaborating and analyzing data sets associated with the enterprise. Recent advancements in the data management industry have seen the rise of governance frameworks that reside functionally alongside data lakes. These governance frameworks contain BDL metadata that enables many functions, such as attempting to reduce business risk (e.g., avoiding data cleanup costs of incorrect customer addresses) and/or enable data monetization (e.g., realizing revenue as products ship on-time to the correct customer address).

One example of such a value-based governance framework is described in U.S. Ser. No. 15/268,046, filed on Sep. 16, 2016 and entitled "Hierarchical Value-Based Governance Architecture for Enterprise Data Assets," the disclosure of which is incorporated by reference herein in its entirety.

However, existing governance approaches do not identify, prioritize and classify critical data elements. As illustratively used herein, a "critical data element" (CDE) is a data element that is or could be critical to an enterprise. What is "critical" to an enterprise depends on the nature of the enterprise, and can be specifically defined by a given enterprise. A CDE for an enterprise may be a data element that is important to the enterprise because some condition attributable to the data element can have an appreciable consequence on the enterprise. By way of non-limiting example, a CDE can be a data element that represents a potential risk to the enterprise (e.g., due to the fact that the data quality is low) and/or a potential lost opportunity to the enterprise (e.g., due to the fact that the importance of the data to the enterprise goes undetected). As will be explained in detail herein, embodiments of the invention provide automated techniques for identifying CDEs, and prioritizing and classifying the level of criticality of such CDEs to the enterprise. It is to be understood that a "data element" may be one or more data items, units, objects, sets, fields (e.g., a column name), or combinations thereof, that are part of the data assets of a given enterprise.

FIG. 1 shows an information processing system 100 configured in accordance with an illustrative embodiment of the present invention. The information processing system 100 is assumed to be built on at least one processing platform and provides value-based governance functionality for data assets of an enterprise. The information processing system 100 of FIG. 1 may employ one or more features of the value-based governance architecture of the above-referenced U.S. Ser. No. 15/268,046. However, it is to be understood that automated CDE management embodiments of the invention are not limited to implementation within any particular value-based governance architecture. Thus, the implementation of automated CDE identification, prioritization and classification, according to embodiments of the invention, may operate within a system architecture such as the one illustrated in FIG. 1, within another system architecture different than the one illustrated in FIG. 1, outside such a system architecture as a standalone function, or some combination thereof.

In this embodiment, the system 100 more particularly comprises a plurality of user devices 102-1, 102-2, ... 102-N coupled to a network 104. Also coupled to the network 104 is a value-based governance system 105. The value-based governance system 105 comprises a data asset governance controller 106, a data asset catalog 108, data sources 112, and technical and business metadata hubs 114. The data asset governance controller 106 also comprises a critical data element (CDE) manager 116, as will be further explained below. The data asset catalog 108 interacts with the technical and business metadata hubs 114 in order to provide integrated technical metadata and business metadata for each of a plurality of the data assets of the enterprise. The value-based governance system 105 is accessible to the user devices 102 over the network 104.

The term "enterprise" as used herein is intended to be broadly construed, and may comprise, for example, a business or other type of organization that performs analytics utilizing data assets.

At least a subset of the data assets of the enterprise comprise data ingested into at least one data lake of the enterprise. A given such data lake in some embodiments comprises a BDL.

The term "data lake" as utilized herein is intended to be broadly construed so as to encompass, for example, a data repository that stores data without optimization for particular predetermined types of analysis or other processing. For example, a data lake can be configured to store data in a manner that facilitates flexible and efficient utilization of the stored data to support processing tasks that may be at least partially unknown or otherwise undefined at the time of data storage. This is in contrast to so-called data warehouses or data marts, which generally store data in accordance with particular predefined sets of data attributes or with predetermined data interrelationships.

Moreover, a data lake in some embodiments can provide the ability to deal with flexible combinations of a wide variety of different types of data in different analytics contexts. Examples of analytics contexts that may be supported by one or more analytics platforms in illustrative embodiments include financial services, telecommunications, health care, life sciences, manufacturing, energy, transportation, entertainment, data center security, sensor data processing and numerous others.

Data lakes in some embodiments provide the ability for the users to store different types of data in various data containers of their choosing. The data containers may be provided in multiple types, formats and storage capabilities. A given data scientist or other user may prefer to utilize one type of data container over another based on familiarity, standards, type of analytics, type of models and processing capabilities.

Also accessible to the user devices 102 over the network 104 is an analytics platform 120 that includes a plurality of analytics workspaces 122-1, 122-2, ... 122-M. The analytics platform 120 is directly coupled to the value-based governance system 105 but can additionally or alternatively communicate with the system 105 over the network 104.

The data asset governance controller 106 is configured to generate analytics actions for one or more of the analytics workspaces 122 based at least in part on the integrated technical metadata and business metadata of the data asset catalog 108. The analytics actions generated by the data asset governance controller 106 illustratively comprise one or more visualizations providing actionable insights into the corresponding data assets.

The CDE manager 116 of the data asset governance controller 106 is configured to automatically identify, prioritize and classify data elements that are considered critical to an enterprise, i.e., critical data elements. As will be further explained below, CDEs are measured by the CDE manager 116 against defined data quality metrics and/or key performance indicators (KPIs). Use of such metrics and indicators minimizes the risk of the data element to the enterprise, and can also increase the opportunity for monetization or other forms of value. For example, in one or more illustrative embodiments, the CDE manager 116 automatically identifies CDEs, and prioritizes and classifies their level of criticality, while also attaching a standardized CDE rationale for the benefit of the enterprise. As a result of this automation, business processes are then created which minimize the risk represented by the CDE and/or maximize the value that can be returned from the CDE.

It is to be appreciated that although the analytics workspaces 122 in this embodiment are implemented in an analytics platform 120 that is separate from the value-based governance system 105, other embodiments can incorporate at least a portion of one or more of the analytics workspaces 122 into the system 105. In addition, although only a single analytics platform 120 is shown in the FIG. 1 embodiment, other embodiments can include multiple analytics platforms each comprising at least one analytics workspace.

The user devices 102 can comprise, for example, desktop, laptop or tablet computers, mobile telephones, or other types of processing devices capable of communicating with at least one of the value-based governance system 105 and the analytics platform 120 over the network 104.

The "users" in a given embodiment may refer, for example, to respective ones of the user devices 102, although the term "user" as utilized herein is intended to be broadly construed so as to encompass numerous other arrangements of human, hardware, software or firmware entities, as well as combinations of such entities. Accordingly, a user may be a human user, or a software entity such as an application, or any of a wide variety of other entity arrangements.

The network 104 may comprise any type of network, including by way of example a global computer network such as the Internet, a wide area network (WAN), a local area network (LAN), a satellite network, a telephone or cable network, a cellular network, a wireless network such as a WiFi or WiMAX network, or various portions or combinations of these and other types of networks.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

In some embodiments, the technical metadata hub is coupled to the business metadata hub via an integration interface providing access to one or more query application programming interfaces (APIs) of the technical metadata hub.

The technical metadata hub of the set of metadata hubs 114 illustratively comprises a technical metadata store, and the business metadata hub of the set of metadata hubs 114 illustratively comprises a business metadata store. The term "metadata store" in this context refers to at least a portion of a storage system configured to store particular types of metadata.

At least portions of the technical metadata are obtained by automated scanning of the data assets of the enterprise. The technical metadata for a given one of the data assets of the enterprise illustratively comprises physical attributes of the given data asset including location, creator, lineage and contents of the given data asset.

At least portions of the business metadata are based at least in part on value-based data asset assessments received from corresponding data asset users associated with respective ones of the user devices 102 via at least one user interface of the business metadata hub. The business metadata for a given one of the data assets illustratively comprises semantic and logical attributes of the given data asset including business definition, usage details, business controls and business owner of the given data asset.

The value-based governance system 105 in the present embodiment is assumed to comprise a multi-level hierarchical architecture having at a lower level of the hierarchical architecture an ingestion level configured to ingest data assets into at least one data lake from data sources 112 of the enterprise and at an upper level of the hierarchical architecture an action level configured to generate the above-noted analytics actions for one or more of the analytics workspaces 122.

The integrated technical metadata and business metadata for a given one of the data assets of the enterprise illustratively provides traceability of the given data asset through the multiple levels of the hierarchical architecture of the value-based governance system 105 from a corresponding analytics action at an upper one of the levels back to its data source at a lower one of the levels.

The multi-level hierarchical architecture in some embodiments may further comprise one or more intermediate levels including at least one of a function generation level and an analytical results model level. For example, the analytical results model level is illustratively configured to facilitate utilization of the data assets in the analytics workspaces by providing at least one of verification and trust assurance for the data assets in accordance with at least one analytical results model. A more detailed example of a multi-level hierarchical architecture of this type will be described below in conjunction with FIG. 3.

The analytics platform 120 may comprise a distributed analytics platform comprising multiple interconnected processing nodes. For example, a given analytics platform in some embodiments is implemented using a plurality of distributed processing nodes, illustratively comprising cloud compute nodes and cloud storage nodes of cloud infrastructure, although numerous other arrangements are possible.

As a more particular example, an illustrative distributed implementation of the analytics platform 120 in one embodiment is configured to perform analytics operations in accordance with a processing framework supported by an Apache Hadoop YARN ("Yet Another Resource Negotiator") or Hadoop 2.0 cluster. Examples of frameworks supported by the Hadoop YARN platform include MapReduce, Spark, Hive, MPI and numerous others.

In some embodiments, a plurality of processing nodes collectively implement at least a portion of a distributed analytics platform that is more particularly in the form of a multi-cluster distributed data processing platform. Such a platform may comprise, for example, a plurality of potentially geographically-distributed YARN clusters each comprising a corresponding cluster of distributed processing nodes.

The value-based governance system 105 of information processing system 100 is illustratively configured to provide an information marketplace framework for managing the data assets of an enterprise in a manner that facilitates the extraction of useful and otherwise actionable insights from the data assets while also implementing agile controls for development utilization. For example, integrating technical metadata obtained by automated scanning with business metadata provides end-to-end traceability from a visualization at a high level of a hierarchical value-based governance architecture to corresponding data sources at a low level of the architecture. Such arrangements provide valuable tools to data analysts, data scientists, data stewards and other users, facilitating information discovery, consumption, insight and collaboration, leading to enhanced monetization of data assets for the enterprise. Accordingly, an enterprise can more readily focus their governance resources on data assets which have high value, are scalable to accelerate growth, can improve product reliability or can be used to recommend customer prescriptive actions.

In some embodiments, value-based governance is implemented by the data asset governance controller 106 in accordance with an agile model which provides an appropriate level of governance as defined by a stakeholder community and value-based consumption to the enterprise. The value-based governance system 105 recognizes that not all data is of equal value and therefore allows the stakeholder community to determine data value, consumption utilization and data sharing parameters. For example, this paradigm can shift data governance for a given enterprise from an internal focus to a focus on what is relevant to govern based on an external customer experience.

The data asset catalog 108 is illustratively configured to ensure that data assets can be easily searched and consumed utilizing robust metadata models that clearly describe and classify the data assets, thereby enabling self-service discovery of critical data assets by data analysts, data scientists, data stewards and other users, as well as by the CDE manager 116.

Governance workflows and processes generated within the value-based governance system 105 provide numerous advantages within the enterprise. For example, such workflows and processes address the challenges faced by data teams in terms of obtaining efficient peer-to-peer access to data assets, onboarding new data assets, obtaining support for new business value cases, promoting data assets to enterprise supported solutions, and understanding data asset corporate policies.

Additionally or alternatively, one or more illustrative embodiments are advantageously configured to realize actionable monetization with visibility to business value cases, to enable data sharing and reuse through analytical models, to provide rapid search capabilities by cataloging asset artifacts and attributes, to accelerate information insight by implementing a business context view in terms that are meaningful to business customers, to verify quality and traceability by applying data quality on CDEs, to drive actionable governance with asset workflow tasks and voting, and to expose new asset creation. These and numerous other types and combinations of value-based governance functionality and features can be provided in other embodiments.

It is to be appreciated that the particular arrangement of system elements shown in FIG. 1 is presented for purposes of illustration only, and that other arrangements of additional or alternative elements can be used in other embodiments. For example, numerous alternative information processing system configurations can be used to implement value-based governance functionality for analytics workspaces of one or more analytics platforms as disclosed herein.

The operation of the system 100 will now be described in further detail with reference to the flow diagram of FIG. 2. The process 200 as shown includes steps 202, 204, 206 and 208, and is suitable for use in the system 100 but is more generally applicable to other types of information processing systems.

In step 202, technical metadata and business metadata relating to data assets of an enterprise are received. For example, with reference to the value-based governance system 105 of the FIG. 1 embodiment, such metadata can be received in at least one of the data asset governance controller 106 and data asset catalog 108 from the set of metadata hubs 114. At least portions of the business metadata are based at least in part on value-based data asset assessments received from corresponding data asset users.

The value-based governance system 105 is further assumed to comprise a multi-level hierarchical architecture having at a lower level of the hierarchical architecture an ingestion level configured to ingest data assets into at least one data lake of the enterprise and at an upper level of the hierarchical architecture an action level configured to generate analytics actions.

In step 204, a data asset catalog is configured to provide integrated technical metadata and business metadata for each of at least a subset of the data assets of the enterprise. For example, the integrated technical metadata and business metadata for a given one of the data assets of the enterprise illustratively provides traceability of the given data asset through the multiple levels of the hierarchical architecture of the value-based governance system 105 from a corresponding analytics action at an upper one of the levels back to its data source at a lower one of the levels.

In step 206, the CDE manger 116 of the data asset governance controller 106 automatically identifies, prioritizes and classifies CDEs among the data assets in the data lake of the enterprise based at least in part on the integrated technical metadata and business metadata of the data asset catalog. Examples of the CDE automation will be further illustratively described below in the context of FIGS. 4 through 8.

In step 208, analytics actions are generated for one or more analytics workspaces based at least in part on the integrated technical metadata and business metadata of the data asset catalog, as well as the CDEs identified, prioritized and classified by the CDE manager 116. For example, in the FIG. 1 embodiment, the data asset governance controller 106 is illustratively configured to generate analytics actions for one or more of the analytics workspaces 122 based at least in part on the CDEs and the integrated technical metadata and business metadata of the data asset catalog 108. The analytics actions generated by the data asset governance controller 106 illustratively comprise one or more visualizations providing actionable insights into the corresponding data assets.

In some embodiments, a given one of the analytics workspaces 122 is configured to perform Big Data analytics based at least in part on information supplied by the value-based governance system 105.

Such an analytics workspace is illustratively configured to leverage one or more frameworks supported by Hadoop YARN, such as MapReduce, Spark, Hive, MPI and numerous others, to support distributed computations relating to enterprise data assets and associated integrated technical and business metadata.

Figure 2:
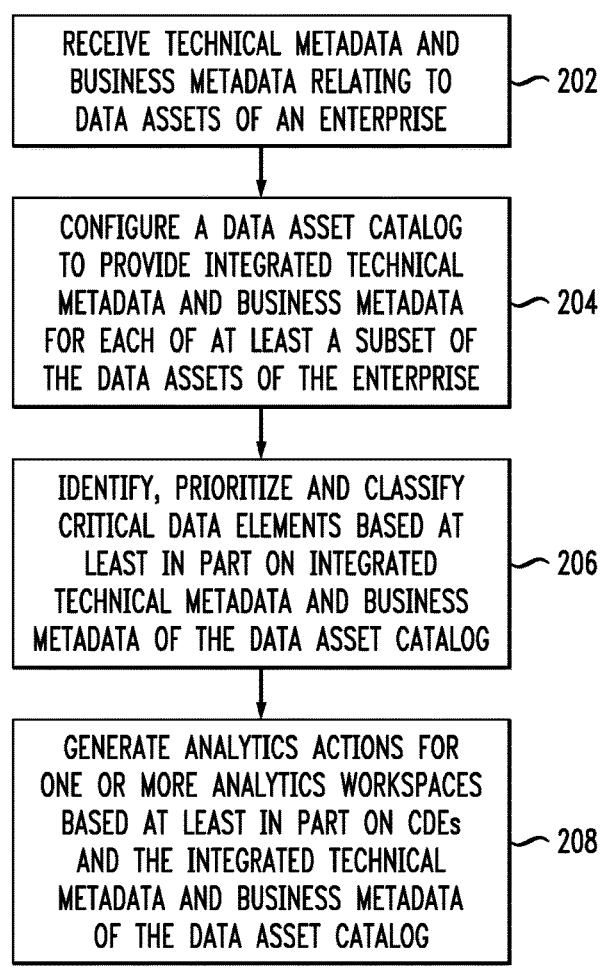
FIG. 2 illustrates an example process of value-based governance for enterprise data assets in the information processing system of FIG. 1.

The particular processing operations and other system functionality described in conjunction with the flow diagram of FIG. 2 are presented by way of illustrative example only, and should not be construed as limiting the scope of the invention in any way. Alternative embodiments can use other types of processing operations for implementing hierarchical value-based governance functionality for analytics workspaces of at least one analytics platform. For example, the ordering of the process steps may be varied in other embodiments, or certain steps may be performed concurrently with one another rather than serially. Also, one or more of the process steps may be repeated periodically for providing value-based governance functionality for different sets of enterprise data assets from respective different sets of data sources, or multiple instances of the process can be performed in parallel with one another for such different sets of enterprise data assets.

It is to be appreciated that functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 3:
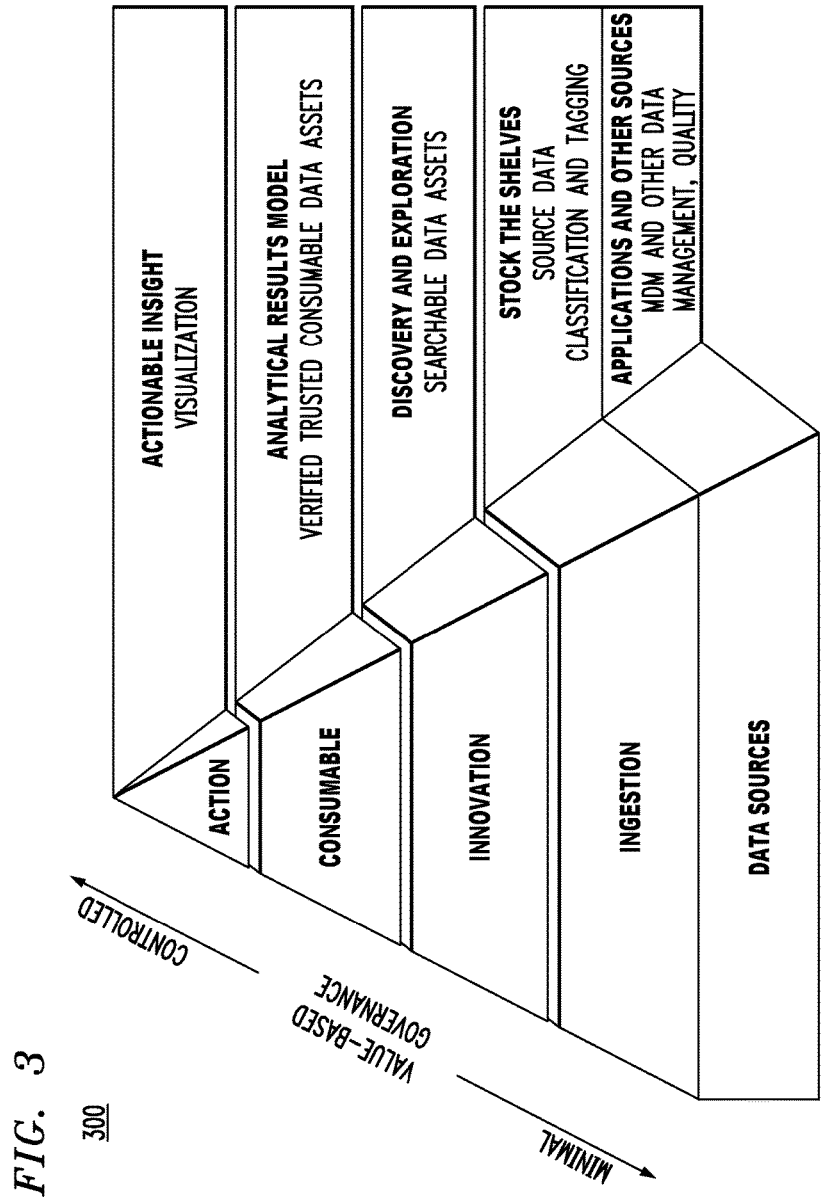
FIG. 3 illustrates an example set of hierarchical levels of a value-based governance architecture, according to an embodiment of the invention.

Referring now to FIG. 3, an example set of hierarchical levels of a value-based governance architecture in an illustrative embodiment is shown. This illustrative value-based governance architecture can be used in the value-based governance system 105 of FIG. 1, although it is to be appreciated that other architectures having different arrangements of levels can be used in other embodiments.

The value-based governance architecture of FIG. 3 includes multiple levels, illustratively arranged in the form of a pyramid 300. More particularly, the value-based governance architecture in this embodiment includes five levels, starting with a Data Sources level as its lowest level and ending with an Action level as its highest level. The architecture in this embodiment further comprises additional levels including an Ingestion level, an Innovation level and a Consumable level. The levels are arranged from the lowest level to the highest level in order of increasing degree of value-based governance, from minimal governance at the Data Sources level to controlled governance at the Action level. As data is ingested from possibly raw forms at the lowest level of the hierarchy, each level of the hierarchy further transforms the data using additional processing and analysis thereby increasing the amount of value-based governance control over the data. Numerous other arrangements of upper, lower and intermediate levels may be used in other embodiments.

The lowest level of the hierarchical architecture in this embodiment is the Data Sources level which illustratively comprises various sources of raw data. For example, the data sources can include enterprise applications, systems, reports and numerous other sources. It is assumed that the Data Sources level provides low-level functions such as master data management (MDM) and other types of data management, as well as quality-related functions such as quality control and quality assurance.

The next level moving up the hierarchical architecture is the Ingestion level. This level is illustratively configured to ingest data assets into at least one data lake from data sources of the enterprise. Additionally or alternatively, data assets can be ingested from one or more external data sources into a data lake. This level illustratively provides functions such as source data classification and tagging. It is used to "stock the shelves" of the value-based governance system 105. For example, the Ingestion level can utilize specific scripts and tools to automate the capturing of the technical metadata. The data lake into which the data assets are ingested illustratively comprises a business data lake or BDL of the enterprise, although additional or alternative ingestion arrangements can be used.

The next level of the hierarchical architecture is the Innovation level. This is an example of a function generation level. It supports discovery and exploration of the ingested data assets and creates searchable data assets for utilization by higher levels. For example, additional business metadata can be captured on the data assets from subject matter experts and stewards to enhance the searching capability.

The Innovation level is followed in the hierarchical architecture by the Consumable level. This level is an example of an analytical results model level. It is configured to facilitate utilization of the data assets in the analytics workspaces 122 by providing at least one of verification and trust assurance for the data assets in accordance with at least one analytical results model. For example, in this embodiment, the Consumable level creates verified, trusted, consumable data assets in accordance with an analytical results model. The analytical models can be scanned to capture the relational metadata to other assets such as formulas, functions, views, schemas and tables. The business metadata at this level can be captured to define the utilization of the analytical results model to promote reuse of the model.

The highest level of the hierarchical architecture in this embodiment is the Action level configured to generate analytics actions. For example, the analytics actions generated at the Action level may comprise one or more visualizations providing actionable insights into the corresponding data assets. The Action level continues to build both technical relational metadata to analytical models as well as business manual metadata providing actionable results from the visualization.

The hierarchical architecture illustrated in FIG. 3 utilizes integrated technical metadata and business metadata for data assets of the enterprise so as to provide traceability of the given data asset through the multiple levels of the architecture from a corresponding analytics action at the Action level back to its data source at the Data Source level.

A governance system implementing a hierarchical value-based architecture of the type illustrated in FIG. 3 can provide numerous advantageous features. For example, it can be used to assign responsibility within the enterprise for a given data asset, help identify and acquire insight for data sources, create and maintain consistent reference data and asset definitions enabling high levels of reusability across consumers, publishing relevant data to appropriate users, monitoring sources for data usage, relevancy and quality, create and manage meaningful business metadata to ensure it is discoverable and searchable by all user, resolve data integrity issues, perform root cause analysis and reconcile data issues, assign classifications such as personally identifiable information (PII), Sensitive, Regulatory or Federal, assign access tagging such as Enterprise, Confidential or Need to Know, provide a liaison between business and IT on data usability and accuracy in reporting and operations, and provide contextual results across all stakeholders minimizing reconciliation of multiple data points. These are just examples of features that may be present in one or more illustrative embodiments, and other embodiments can provide additional or alternative features.

The data asset catalog 108 collects and maintains the information gathered through the hierarchical value-based governance architecture implemented in the value-based governance system 105. For example, the data asset catalog 108 is illustratively configured to store for each data asset information such as where the data asset is located, what it means, how it is related to other data assets and how it can be used to produce meaningful results in accordance with the hierarchical value-based governance architecture. All data assets of the enterprise may be cataloged in this manner, including data assets associated with diverse types of enterprise IT systems such as Hadoop, Greenplum, Business Intelligence, Data Warehousing & Reporting, Enterprise Resource Planning (ERP), Human Capital Management, MDM and numerous other types of enterprise systems.

Thus, in a governance system implementing a hierarchical value-based architecture of the type illustrated in FIG. 3, a primary approach for increasing governance is to have data stewards tag data elements (fields or data sets) with governance metadata (e.g., technical metadata and/or business metadata). These data stewards often have the most insight into the increasing value of the data and therefore are the most capable representatives to understand which data elements are critical and which are not. In addition to the data stewards, subject matter experts (SMEs) also may be used to identify and mark critical data elements.

One embodiment in an information marketplace framework such as the value-based governance system 105 is to create two separate fields of metadata that are manually populated by a data steward or SME. A first field is a CDE_Flag field which designates whether the data element is critical (e.g., flag set to a logic I/O representing yes/no). A second field is a CDE_Rationale field which represents a reason for marking the data element as critical.

Once data elements are flagged as critical, this allows the enterprise to vigorously pursue data quality for those data elements, which leads to reduced monetary loss due to the data and/or increased revenue/monetization from the data.

However, data stewards and data SMEs require training on the information marketplace framework to fully understand the value of making regular and disciplined metadata contributions. This includes instruction and advice for flagging CDEs and creating the appropriate metadata by filling in the two fields described above. There are a number of reasons that this flagging may not occur in a timely or correct fashion, for example, misunderstanding or misapplication of the training instructions; neglecting to implement the training instructions; re-assignment to different roles; lack of time; and lack of insight into the evolving use of a data element. Such a lack of flagging puts the enterprise in jeopardy of reduced business benefits.

Furthermore, flagging a data element incorrectly as critical will result in business resources applied to the data element in terms of applying tools and human resources to begin cleansing/conditioning data and improving its quality. This may divert attention away from CDEs that truly do need more attention.

As stewards and SMEs justify CDE flagging, they may enter justifications that are significantly different across the information marketplace framework. Training on "how to justify" CDE flagging can of course help this problem, but users of the information marketplace framework are likely to witness a standard syntax for justifying CDEs in a way that is comprehensible and consistent. As a result, business users are left wondering whether the data element is critical for their specific business use or not.

The two-field approach described above provides a simple "yes/no" for a data element and provides no insight into "how" critical the data element is for the enterprise. Existing governance systems provide no ranking system or value system for allowing the enterprise to understand which data elements are most critical. As the data lake of the enterprise grows in size, the lack of this ability makes it difficult for the data governance staff to know which CDEs need the most attention based on relative criticality.

A responsible data steward or SME may be fully aware of all of their data elements and appropriately mark CDEs under their governance control. However, as data elements, fields, and assets are combined to create new data elements, there may not be a steward or SME that takes responsibility to consider whether or not this derived data element is "critical" or not. This results in a large subset of data elements within the data lake that are not considered as critical, therefore putting the enterprise at risk.

When a problem ultimately occurs within the enterprise that: (a) causes significant business loss; and (b) can be traced back to a data element that was not marked as critical, there is no existing way for the enterprise to understand "why" the data element was not marked as a CDE, and significant manual audit control (e.g., review of emails, interviews, etc.) must occur to explore the reasons.

While data stewards and SMEs certainly have visibility into data science activity occurring across a data lake, they primarily have manual access into the data asset catalog and cannot keep up with massive amounts of activity happening elsewhere in the data lake. They are therefore unaware of new activity in other business units that may or may not promote their own data elements to critical status (e.g., these business units are reaching incorrect conclusions by not using a specific data element). Therefore, critical data elements go unflagged.

To overcome the above and other drawbacks associated with existing data governance systems, illustrative embodiments configure the CDE manager 116 (FIG. 1) to automatically identify data elements as CDEs, prioritize and classify the level of criticality of the CDEs, and attach a standardized CDE rationale for the benefit of the enterprise. Business processes can then be created that either minimize the risk represented by the CDE or maximize the value that can be returned from them. By "prioritize," it is illustratively meant that the value-based governance system 105 gives priority to actions involving CDEs over data elements that are not flagged as critical, and among data elements classified as CDEs, the system give priority to actions involving CDEs with a higher level of criticality as compared with those with lower levels of criticality.

Figure 4:
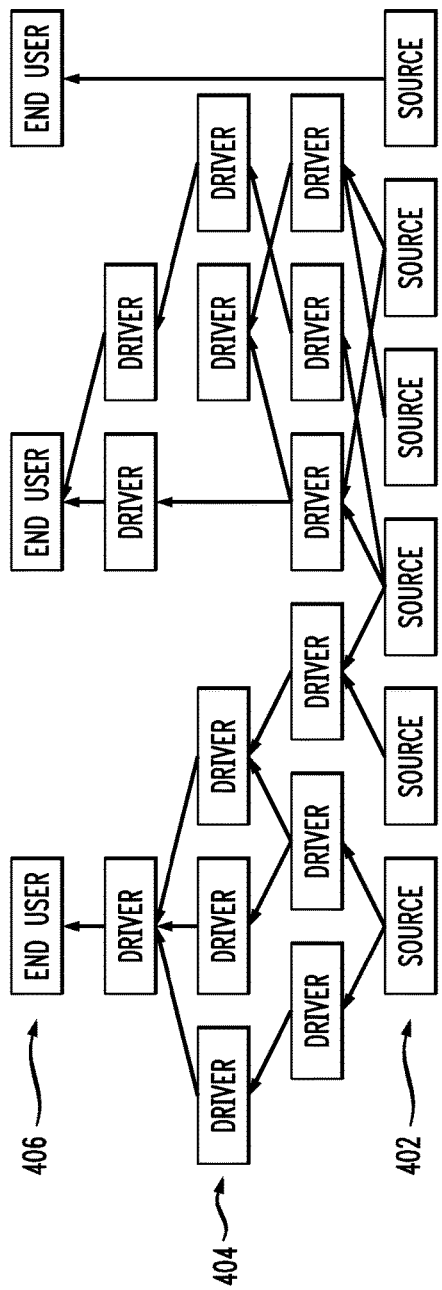
FIG. 4 illustrates a data asset lineage map, according to an embodiment of the invention.

FIG. 4 illustrates a data asset lineage map 400 according to an embodiment of the invention. In illustrative embodiments, the CDE manager 116 generates and maintains such a data asset lineage map 400. Alternatively, one or more other components of the value-based governance system 105, or one or more components outside the system, may generate and maintain the lineage map.

As shown, data elements within the data lake are mapped into nodes of a hierarchical architecture consistent with the pyramid 300 shown and described in the context of FIG. 3. More particularly, data elements, such as the bottom-most level source elements 402 (or fields within those elements), are fed into and combined with other data elements to create either driver (intermediate) data elements 404 and/or end-user analytic results 406 (depicted in the top level). Note that in some embodiments the source data elements 402 correspond to the data assets ingested into the data lake at the Ingestion level from the Data Source level in pyramid 300, while the driver data elements 404 correspond to data at the Innovation level and end-user analytics results 406 correspond to the Consumable level and/or Action level.

Based on the data asset lineage map 400, the CDE manager 116 automatically associates each data element with a cardinality representing how often it is consumed and passed up to end-user results. As illustratively used herein, "cardinality" is the number of elements in a set or other grouping, as a property of that grouping.

For example, the table 500 in FIG. 5 contains cardinality measurements for the bottom-most six source nodes in lineage map 400 (source1, source2, . . . source6). This cardinality is a count of how often each data asset is consumed by an end-user, as well as how often it is consumed by any other node further up in the hierarchy of the lineage map 400. Thus, for example, as shown in table 500, source1 is consumed by two driver nodes at a first intermediate level in map 400, and data from those two driver nodes is consumed by three driver nodes at a second intermediate level. Data from the three driver nodes at the second intermediate level is consumed by a single driver node at a third intermediate level. Data from the single driver node at the third intermediate level is consumed by a single end-user node. Thus, the cardinality for source1 with respect to all nodes is 7 (a total of seven nodes are in the hierarchical path that originates with source1), and with respect to end-user nodes the cardinality is 1 (a total of one end-user node is in the hierarchical path that originates with source1). Table 500 shows similarly calculated cardinality measures for the other five source nodes.

A lineage map for data assets, such as lineage map 400, can be created in any number of ways. In one embodiment, the lineage is created by a combination of running nightly scans of data assets in a data lake (by way of example only, a data processing product available from Attivio of Newton, Mass.) and running software that is aware of analytic assets that create driver and end user data assets (by way of example only, a data processing product available from Collibra of New York, N.Y.).

Thus, as illustrated by table 500, the lineage data is augmented by maintaining cardinality metadata that tracks attributes such as "number of end user nodes" and/or "number of connections to all nodes" (and/or any other cardinality criteria). As the cardinality metadata meets or crosses predefined thresholds (e.g., data asset is consumed by greater than 3 end-user assets), the data element can be flagged as critical, i.e., flagged by the CDE manager 116 as a CDE. The formula for cardinality-based thresholding can focus on the crossing of one threshold (e.g., end-user nodes), multiple thresholds (e.g., both end-user and all nodes), and/or an equation that takes into account multiple variables (e.g., addition of end user nodes and all nodes being greater than 10, by way of example, see source3 in table 500 which is 2+11=13).

The CDE manager 116 is also configured to flag derived CDEs. That is, the CDE manager 116 can also assign criticality to intermediate data elements (depicted as "driver" elements in lineage map 400 in FIG. 4). This provides an automated way to recognize critical data assets for those cases where a derived data set may go unrecognized by a data steward or SME.

In addition to flagging an asset as critical, the CDE manager 116 can attach additional metadata to the data element which describes the reasoning for flagging the data element as critical. FIG. 6 shows such a resulting data structure in the form of table 600 for source3. In this illustrative embodiment, the rationale captured is represented as a table but can certainly be an alternative data structure such as, but not limited to, a database row, an XML file, etc.

The CDE manager 116 can implement rationale in such a way that it can watch fluctuating rationale over time (e.g., using timestamps and a linked list of rationales) and also prevent tampering (e.g., fingerprinting the rationale with a hash value). This automated historical and auditable functionality allows the CDE manager 116 to track interesting fluctuations which may actually cause the asset to become non-critical (e.g., data assets are pruned from a data lake). Alternatively, a CDE can be assumed to be "once critical, always critical" such that the CDE manager 116 does not reflag a data element as non-critical once it has been flagged as a CDE.

Figure 7:
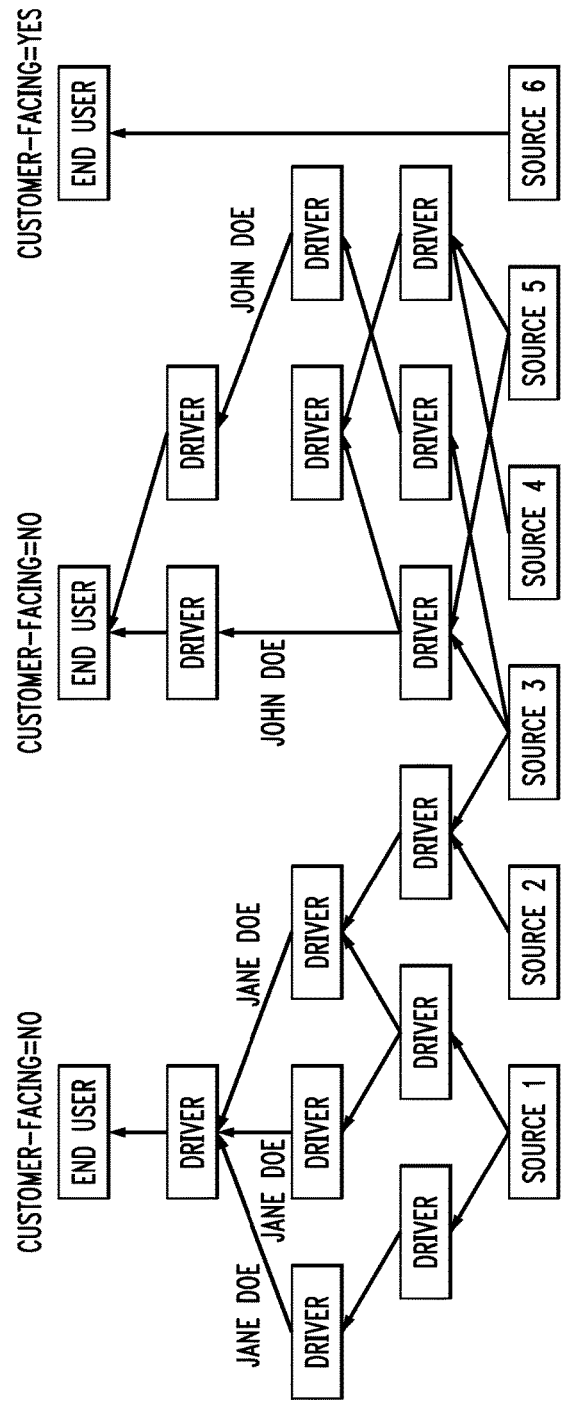
FIG. 7 illustrates another data asset lineage map, according to an embodiment of the invention.

Illustrative embodiments also provide for the CDE manager 116 to augment cardinality with business relevance. For example, in addition to calculating the cardinality of a data element, the lineage chain can be walked to determine the degree to which a data element is relevant to different lines of business. There are a variety of ways to manage relevance using the lineage calculated by the value-based governance system 105. FIG. 7 illustrates a data asset lineage map 700 that highlights two methods for adding business relevance.

One of the metadata attributes that is assigned to data elements in the data lake is whether or not the data is "customer-facing" i.e., dealing directly with a customer of the enterprise. In one embodiment, the metadata attribute is implemented as a flag (e.g., flag set to a logic I/O representing yes/no). This flag can be used by the CDE manager 116 as an additional data value to help determine criticality. For example, the CDE manager 116 can implement one or more of the following criteria: all data elements marked as customer-facing can be flagged as CDEs; all data elements that are an ancestor of a customer-facing data element can be marked as CDEs; and the cardinality of a data element can be doubled (or tripled) if it has a customer-facing data element in its lineage.

For example, from lineage map 700 in FIG. 7, the CDE manager 116 can determine that source6 is "more critical" than any other source data element because it contributes to a customer-facing data element, as shown.

Another approach to determining relevance is to calculate which lines of business are consuming a given data element, and/or how many lines of business are consuming the data element. Such additional metadata may be used by the CDE manager 116 to prioritize and classify CDEs.

For example, it is possible (as indicated in lineage map 700 in FIG. 7) to identify that "Jane Doe" is a data scientist working in the sales organization of the subject enterprise. Identifying Jane Doe and her enterprise affiliation in the map is enabled by including metadata such as her company ID (identifier) in the data stored at the driver nodes shown in the map (nodes over which her name appears) when she has some connection to whatever operation occurred on the data associated with those driver nodes. As such, this means that three data elements in the map are contributing to end-user results that are related to the sales of products. This may cause these three data elements (source1, source2, and source3) to receive different consideration by the CDE manager 116 in regards to determining criticality. On the other hand, "John Doe" works for Human Resources (HR), and an automated relevance calculator used by the CDE manager 116 may have an algorithm that weights data science in HR (source3, source4, and source5) as lower in relevance than data science activity in Sales.

Note that source3 in map 700 in FIG. 7 is leveraged by both John Doe and Jane Doe. The fact that a data element is consumed by multiple lines of business may cause the CDE manager 116 to deem it to be critical or give it a value that crosses over a threshold for criticality.

In all cases, for cardinality, for relevance by customer-facing, or for relevance by line of business, a score (or scores) is calculated by the CDE manager 116 which trigger threshold crossings and potential promotion to a CDE. At the time of calculation, the CDE manager 116 also logs all decisions that were used to promote to a CDE for future audit.

Figure 8:
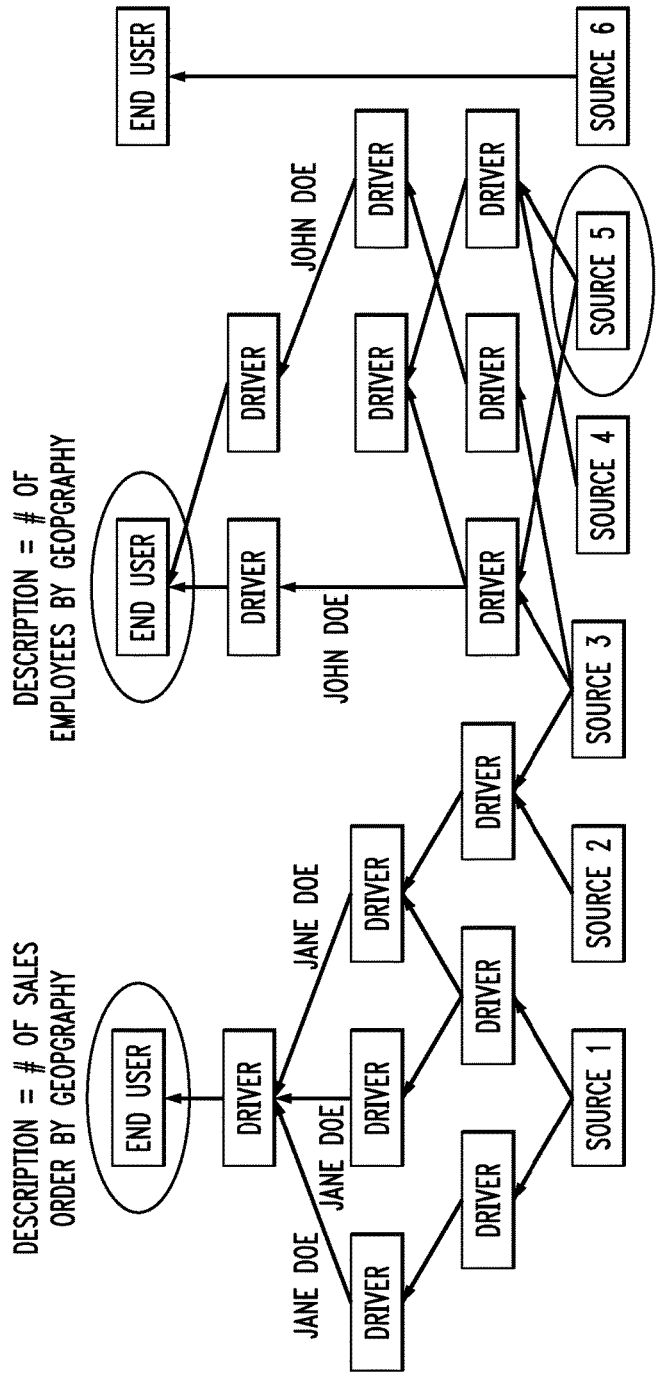
FIG. 8 illustrates yet another data asset lineage map, according to an embodiment of the invention.

Another automated algorithm that can be used by the CDE manager 116 to flag CDEs attempts to "match" data elements that are not necessarily connected via direct lineage but that could represent potential criticality to the enterprise. FIG. 8 highlights an example in the context of data asset lineage map 800.

In this example, assume that source5 is not marked as critical because: its cardinality has not triggered any thresholds; and it has not been marked as relevant through any of the additional algorithms mentioned above. However, the CDE manager 116 is configured to apply a cross-lake correlation algorithm to determine that source5 is highly relevant to an end-user data element that is outside of its lineage (top left end-user node in map 800 in FIG. 8).

This algorithm works by leveraging metadata that has been attached by data stewards and SMEs. For example, assume that Jane Doe worked on an analytic algorithm that created an internal end user report that was highly relevant to sales orders in particular regions. Jane Doe (or another steward/SME) then attached a metadata description to that data element that described the value and/or context of the data element (in this simple example, the description is "# of sales orders by geography").

Jane Doe may not have been aware that source5 made strong contributions of geographic data to another end-user report (# of employees by geography). Using techniques such as natural language processing, stemming algorithms, etc., an automated scanner employed by the CDE manager 116 can identify "potential CDEs" based on the possibility that source5 would be of some value to Jane Doe's work, reports, or algorithms. Flagging source5 as a "potential CDE" and creating "dashed line lineage" between data elements can result in increased cardinality and relevance, which could push source5 over the threshold.

By way of one example, offline (e.g., overnight), data assets are crawled and tokenized to identify indirect connections associated with data elements that could be important to the enterprise. These data elements are therefore marked as potential CDEs. In this way, the line of business relevance is advantageously increased by searching similar context and marking any such data elements as potential CDEs.

It is to be appreciated that while the CDE manager 116 is shown in FIG. 1 as being implemented as part of the data asset governance controller 106, the CDE manager 116 can additionally or alternatively be implemented as a separate standalone component. Furthermore, while the lineage, criticality and other metadata generated by the CDE manager 116 for given data elements of the data assets in data asset catalog 108 can be stored in the integrated technical and business metadata hubs 114, such metadata generated by the CDE manager 116 can additionally or alternatively be stored in separate standalone storage. Also, it is to be appreciated that the level of criticality computed for a data element by the CDE manager 116 may use data quality metrics and KPIs other than those illustratively mentioned herein. That is, the cardinality, relevance and correlation criteria described above can be supplemented with existing data quality metrics and KPIs typically used in data lake management.

As mentioned previously, at least portions of the information processing system 100 may be implemented using one or more processing platforms. Illustrative embodiments of such platforms will now be described in greater detail in conjunction with FIGS. 9 and 10. Although described primarily in the context of information processing system 100, these platforms may also be used to implement at least portions of other information processing systems in other embodiments of the invention.

Figure 9:
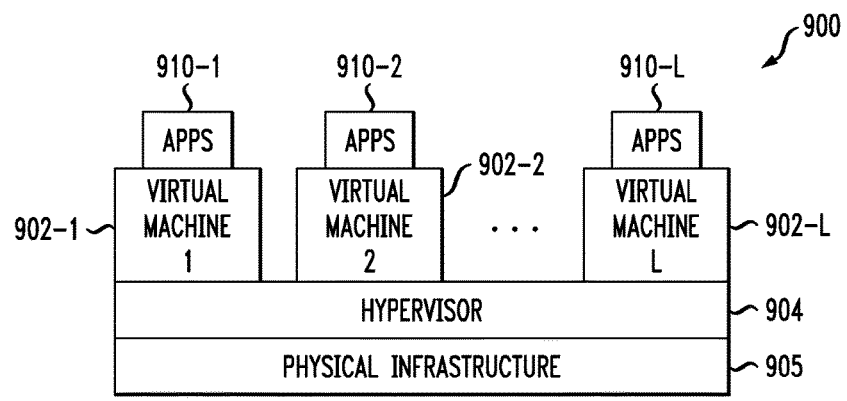
FIGS. 9 and 10 show examples of processing platforms that may be utilized to implement at least a portion of an information processing system in illustrative embodiments.
Figure 10:
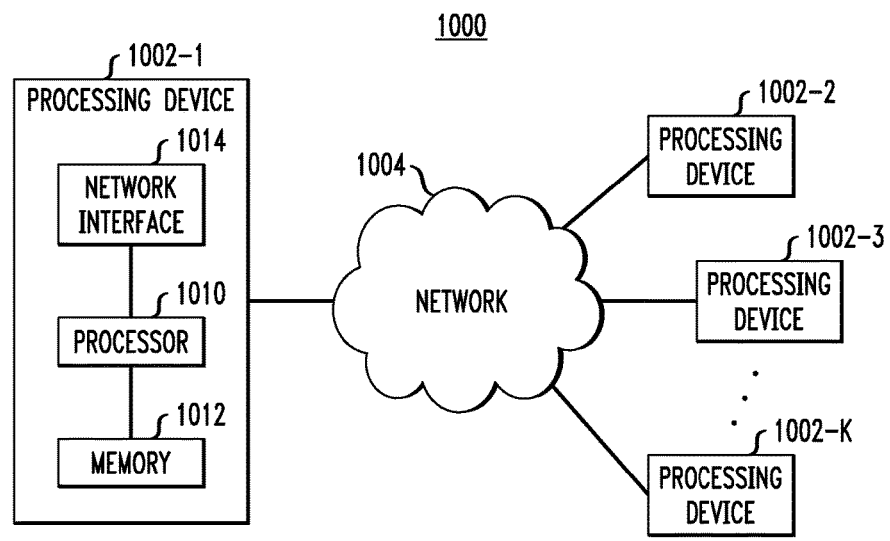

FIG. 9 shows an example processing platform comprising cloud infrastructure 900. The cloud infrastructure 900 comprises a combination of physical and virtual processing resources that may be utilized to implement at least a portion of the information processing system 100. The cloud infrastructure 900 comprises virtual machines (VMs) 902-1, 902-2, . . . 902-L implemented using a hypervisor 904. The hypervisor 904 runs on physical infrastructure 905. The cloud infrastructure 900 further comprises sets of applications 910-1, 910-2, . . . 910-L running on respective ones of the virtual machines 902-1, 902-2, . . . 902-L under the control of the hypervisor 904.

These and other types of cloud infrastructure can be used to implement one or more system components, such as hierarchical value-based governance system 105, analytics platform 120, or combinations or portions thereof, in a given embodiment.

Although only a single hypervisor 904 is shown in the embodiment of FIG. 9, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 904 and possibly other portions of the information processing system 100 in one or more embodiments of the invention is the VMware® vSphere® which may have an associated virtual infrastructure management system such as the VMware® vCenter™. The underlying physical machines may comprise one or more distributed processing platforms that include one or more storage systems.

Such storage systems can comprise any of a variety of different types of storage including network-attached storage (NAS), storage area networks (SANs), direct-attached storage (DAS) and distributed DAS, as well as combinations of these and other storage types, including software-defined storage.

Particular types of storage products that can be used in implementing a given storage system in an illustrative embodiment include VNX® and Symmetrix VMAX® storage arrays, software-defined storage products such as ScaleIO™ and ViPR®, flash-based storage arrays such as DSSD™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators in the S-Series, X-Series and NL-Series product lines, all from EMC Corporation. Combinations of multiple ones of these and other storage products can also be used in implementing a given storage system in an illustrative embodiment.

More specifically, some embodiments can comprise a storage system implemented using DAS configurations comprising local hard drives in respective servers. Such a storage system may additionally or alternatively comprise specialized high-performance flash storage such as DSSD™ accessible via PCIe connections. Numerous other configurations are possible for a given storage system or other related components of the system 100.

As is apparent from the above, one or more of the processing modules or other components of system 100 may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

As mentioned previously, some networks utilized in a given embodiment may comprise high-speed local networks in which associated processing devices communicate with one another utilizing PCIe cards of those devices, and networking protocols such as InfiniBand, Gigabit Ethernet or Fibre Channel.

The processing device 1002-1 in the processing platform 1000 comprises a processor 1010 coupled to a memory 1012.

The processor 1010 may comprise a microprocessor, a microcontroller, an application-specific integrated circuit (ASIC), a field-programmable gate array (FPGA) or other type of processing circuitry, as well as portions or combinations of such circuitry elements.

The memory 1012 may comprise random access memory (RAM), read-only memory (ROM) or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

For example, other processing platforms used to implement embodiments of the invention can comprise different types of virtualization infrastructure, in place of or in addition to virtualization infrastructure comprising virtual machines. Such virtualization infrastructure illustratively includes container-based virtualization infrastructure configured to provide Docker containers or other types of Linux containers (LXCs).

The containers may be associated with respective tenants of a multi-tenant environment of the system 100, although in other embodiments a given tenant can have multiple containers. The containers may be utilized to implement a variety of different types of functionality within the system 100. For example, containers can be used to implement respective cloud compute nodes or cloud storage nodes of a cloud computing and storage system. The compute nodes or storage nodes may be associated with respective cloud tenants of a multi-tenant environment of system 100. Containers may be used in combination with other virtualization infrastructure such as virtual machines implemented using a hypervisor.

As another example, portions of a given processing platform in some embodiments can comprise converged infrastructure such as VxRail™, VxRack™ or Vblock® converged infrastructure commercially available from VCE, the Virtual Computing Environment Company, an EMC Federation Company. For example, portions of a value-based governance system of the type disclosed herein can be implemented utilizing converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of a data asset governance controller, CDE manager, data asset catalog, technical metadata hub, business metadata hub or other component of a hierarchical value-based governance system are illustratively implemented in one or more embodiments the form of software running on a processing platform comprising one or more processing devices.

It should again be emphasized that the above-described embodiments of the invention are presented for purposes of illustration only. Many variations and other alternative embodiments may be used. For example, the disclosed techniques are applicable to a wide variety of other types of information processing systems, value-based governance systems, analytics platforms, analytics workspaces and other components. Also, the particular configurations of system and device elements, associated processing operations and other value-based governance functionality illustrated in the drawings can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
    obtaining data elements from data assets associated with an enterprise;
    identifying one or more of the data elements as one or more critical data elements based on a level of criticality computed for each of the one or more data elements;
    wherein the level of criticality is based on a cardinality computed for the one or more data elements and wherein the cardinality of a data element is computed as the total number of nodes in a data lineage map that have consumed the data element or a derivation of the data element; wherein the level of criticality is based on a correlation criterion computed for the one or more data elements; wherein the correlation criterion is based on indirect correlation identified between a given data element and portions of the enterprise for which the data element is potentially critical the indirect correlation being calculated through application of a correlation algorithm against the given data element and another data element that is not connected to the given data element in the data lineage map; and
    wherein the obtaining and identifying are implemented by one or more processing devices each comprising a processor coupled to a memory.

2. The method of claim 1, further comprising:
    generating a rationale for identifying each of the one or more data elements as one or more critical data elements; and
    storing the rationale in an accessible data structure referenced by the one or more critical data elements.

3. The method of claim 2, wherein the generated rationale is based on a standardized rationale criteria.

4. The method of claim 1, wherein a data element is identified as a critical data element when its computed cardinality is greater than or equal to a given threshold value.

5. The method of claim 1, wherein the cardinality of a data element is computed as the number of end-user nodes in a data lineage map that have consumed the data element or a derivation of the data element.

6. The method of claim 1, wherein the level of criticality is based on a relevance criterion computed for the one or more data elements.

7. The method of claim 6, wherein the relevance criterion is based on whether or not the data element is directly accessible to an entity of importance to the enterprise.

8. The method of claim 6, wherein the relevance criterion is based on which portions of the enterprise are consuming the data element.

9. The method of claim 6, wherein the relevance criterion is based on how many portions of the enterprise are consuming the data element.

10. A computer program product comprising a non-transitory processor-readable storage medium having stored therein program code of one or more software programs, wherein the program code when executed by at least one processing device causes said at least one processing device to:
    obtain data elements from data assets associated with an enterprise; and
    identify one or more of the data elements as one or more critical data elements based on a level of criticality computed for each of the one or more data elements, the level of criticality being based on a cardinality computed for the one or more data elements, the cardinality of a data element being computed as the total number of nodes in a data lineage map that have consumed the data element or a derivation of the data element; wherein the level of criticality is based on a correlation criterion of an indirect correlation identified between a given data element and portions of the enterprise for which the data element is potentially critical, the indirect correlation being calculated through application of a correlation algorithm against the given data element and another data element that is not connected to the given data element in the data lineage map.

11. The computer program product of claim 10, wherein the program code when executed by the at least one processing device causes the at least one processing device to also:
    generate a rationale for identifying each of the one or more data elements as one or more critical data elements; and
    store the rationale in an accessible data structure referenced by the one or more critical data elements.

12. An apparatus comprising:
    at least one processing platform accessible to a plurality of user devices over at least one network;
    wherein the processing platform implements a critical element manager for data assets of an enterprise, and wherein the critical data element manager is configured to:
    obtain data elements from the data assets associated with the enterprise; and
    identify one or more of the data elements as one or more critical data elements based on a level of criticality computed for each of the one or more data elements, the level of criticality being based on a cardinality computed for the one or more data elements, the cardinality of the data element being computed as the total number of nodes in a data lineage map that have consumed the data element or a derivation of the data element;
    wherein the processing platform is implemented by one or more processing devices each comprising a processor coupled to a memory wherein the level of criticality is based on a correlation criterion of an indirect correlation identified between a given data element and portions of the enterprise for which the data element is potentially critical, the indirect correlation being calculated through application of a correlation algorithm against the given data element and another data element that is not connected to the given data element in the data lineage map.

13. The apparatus of claim 12, wherein the critical data element manager is further configured to:
    generate a rationale for identifying each of the one or more data elements as one or more critical data elements; and
    store the rationale in an accessible data structure referenced by the one or more critical data elements.

14. The apparatus of claim 13, wherein the generated rationale is based on a standardized rationale criteria.

15. The apparatus of claim 12, wherein the level of criticality is based on a relevance criterion computed for the one or more data elements.

16. The apparatus of claim 12, wherein the level of criticality is based on an indirect correlation criterion computed for the one or more data elements.

* * * * *